(12) United States Patent
Narang et al.

(10) Patent No.: US 10,390,313 B2
(45) Date of Patent: Aug. 20, 2019

(54) POWER ADAPTATION IN AN ELECTRONIC DEVICE

(71) Applicant: Apple Inc., Cupertino, CA (US)

(72) Inventors: Mohit Narang, San Jose, CA (US); Peter Agboh, San Francisco, CA (US); Vusthla Sunil Reddy, San Jose, CA (US); Chia Yiaw Chong, San Jose, CA (US); Indranil S. Sen, Fremont, CA (US); Ruben Caballero, San Jose, CA (US); Manjit S. Walia, San Jose, CA (US); Xi Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 15/014,506

(22) Filed: Feb. 3, 2016

(65) Prior Publication Data
US 2016/0165552 A1  Jun. 9, 2016

Related U.S. Application Data

(63) Continuation-in-part of application No. 14/474,718, filed on Sep. 2, 2014, now abandoned.

(60) Provisional application No. 62/111,457, filed on Feb. 3, 2015.

(51) Int. Cl.
| | |
|---|---|
| *H04W 52/28* | (2009.01) |
| *H04W 72/04* | (2009.01) |
| *H04W 4/02* | (2018.01) |
| *H04W 52/02* | (2009.01) |
| *H04W 4/80* | (2018.01) |

(52) U.S. Cl.
CPC ......... *H04W 52/283* (2013.01); *H04W 4/025* (2013.01); *H04W 4/80* (2018.02); *H04W 52/0277* (2013.01); *H04W 72/0473* (2013.01); *Y02D 70/00* (2018.01); *Y02D 70/1242* (2018.01); *Y02D 70/1262* (2018.01); *Y02D 70/142* (2018.01); *Y02D 70/144* (2018.01)

(58) Field of Classification Search
CPC .......................... H04W 52/0277; Y02B 60/50
See application file for complete search history.

(56) References Cited

U.S. PATENT DOCUMENTS

| | | |
|---|---|---|
| 7,082,107 B1 | 7/2006 | Arvelo |
| 7,260,395 B1 * | 8/2007 | Hughes ................. H04W 48/08 455/432.2 |
| 2006/0035660 A1 | 2/2006 | Anderson |

(Continued)

*Primary Examiner* — Sulaiman Nooristany
(74) *Attorney, Agent, or Firm* — Sterne, Kessler, Golstein & Fox P.L.L.C.

(57) ABSTRACT

In order to improve communication with another electronic device, during an advertising mode an electronic device (such as a smartphone) may transmit a packet with advertising information using a default transmit power level. Then, based on feedback about a performance metric associated with the communication from the other electronic device, the electronic device may selectively increase the transmit power level for a subsequent packet. Because this selective increase in the transmit power level may increase the overall power consumption, the change in the transmit power level also may depend on one or more factors, such as a battery power level of the electronic device. However, the selective increase in the transmit power level may, in some instances, decrease the overall power consumption by reducing or eliminating retries.

20 Claims, 9 Drawing Sheets

(56) References Cited

U.S. PATENT DOCUMENTS

| | | | |
|---|---|---|---|
| 2006/0187866 A1* | 8/2006 | Werb | G01D 4/004 370/311 |
| 2007/0285276 A1* | 12/2007 | Lazar | G01D 4/002 340/870.02 |
| 2009/0067398 A1* | 3/2009 | Green | H04W 48/16 370/338 |
| 2013/0154693 A1 | 6/2013 | Moeglein et al. | |
| 2015/0133054 A1* | 5/2015 | Chen | H04W 74/002 455/41.2 |
| 2015/0304822 A1* | 10/2015 | Han | H04W 4/06 370/311 |

* cited by examiner

POWER ADAPTATION IN AN ELECTRONIC DEVICE

CROSS-REFERENCE TO RELATED APPLICATIONS

The present application is a continuation-in-part of and claims priority to co-pending U.S. patent application Ser. No. 14/474,718, filed on Sep. 2, 2014, and also claims priority to U.S. Provisional Patent Application No. 62/111,457, filed on Feb. 3, 2015, both of which are hereby incorporated by reference in their entireties.

BACKGROUND

Field

The described embodiments relate to techniques for improving the communication quality of an electronic device.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface.

In many wireless-communication protocols, electronic devices detect each other by regularly transmitting advertising data or packets (in the parlance of Bluetooth Low Energy (BTLE) technology) and scanning for the advertising data or packets from other electronic devices. For example, an electronic device may communicate such advertising packets using a communication protocol that is compatible with BTLE.

However, the communication of advertising packets in communication protocols such as BTLE is often limited by power constraints in portable electronic devices. In particular, under some regulations, BTLE is characterized as a distributed-frequency spread-spectrum (DFSS) communication protocol instead of a frequency-hopping spread-spectrum (FHSS) communication protocol because it often does not meet the minimum number of hopping channels and dwell time requirements of FHSS. This can degrade the performance of the communication with the other electronic devices, which can degrade the user experience.

SUMMARY

The described embodiments include an electronic device. This electronic device includes: an antenna; and an interface circuit, coupled to the antenna, which communicates with another electronic device using a communication protocol. During operation, the interface circuit: transmits a packet to the other electronic device during an advertising mode using a first transmit power level; receives feedback from the other electronic device about the communication, where the feedback includes information specifying a performance metric associated with the communication; and selects a transmit power level used to transmit a subsequent packet based on a power-state flag. Moreover, the electronic device includes a processor and memory that stores a program module. During operation, the processor executes the program module to improve communication quality. In particular, the program module compares the performance metric to a threshold value; and selectively modifies the power-state flag based on the comparison, where the modification changes the power-state flag from a value associated with a low-power state to a value associated with a high-power state, and where a second transmit power level in the high-power state is larger than the first transmit power level in the low-power state.

The performance metric can include: a bit error rate, a packet error rate, a received signal strength indicator, and/or another link quality metric.

Moreover, the selective modifying may be based on a battery power level.

Furthermore, a difference between the second transmit power level and the first transmit power level may be fixed. Alternatively, the difference between the second transmit power level and the first transmit power level may be variable. For example, during operation the program module further may dynamically select the second transmit power level when the power-state flag is selectively modified.

Additionally, the second transmit power level may reduce a net power consumption of the electronic device by reducing retries during the communication between the electronic device and the other electronic device.

In some embodiments, after selectively modifying the power-state flag, the program module monitors a set of trigger events and, when a trigger event is detected, repeats the selective modification of the power-state flag. For example, the set of trigger events may include: a change in the performance metric, and/or establishing a Bluetooth Low Energy connection with an additional electronic device.

The communication protocol may include Bluetooth Low Energy.

Other embodiments provide computer-program products for use with the receiving electronic device. The computer-program products include instructions for at least some of the operations performed by the electronic device described previously.

Other embodiment provide an electronic device that includes: the antenna; and an interface circuit, coupled to the antenna, which communicates with the other electronic device using Bluetooth Low Energy. During operation, the interface circuit: transmits the packet to the other electronic device using the first transmit power level; and receives the feedback from the other electronic device about the communication, where the feedback includes the information specifying the performance metric associated with the communication. Then, the interface circuit: compares the performance metric to the threshold value; and selectively transitions from the low-power state to the high-power state based on the comparison, where the second transmit power level during the communication in the high-power state is larger than the first transmit power level during the communication in the low-power state.

Other embodiments provide the interface circuit described previously.

Still other embodiments provide methods for selectively modifying an operating mode of an electronic device. During operation, the electronic device transmits the packet to the other electronic device during the advertising mode using the first transmit power level. Then, the electronic device receives the feedback from the other electronic device about the communication, where the feedback includes the information specifying the performance metric associated with the communication. The electronic device also compares the performance metric to the threshold value.

Next, the electronic device selectively modifies the power-state flag based on the comparison, where the modification changes the power-state flag from the value associated with the low-power state to the value associated with the high-power state, and where the second transmit power level in the high-power state is larger than the first transmit power level in the low-power state. Furthermore, the electronic device selects the transmit power level used to transmit the subsequent packet based on the power-state flag.

This application further encompasses additional embodiments that relate to an electronic device. This electronic device includes: an antenna; and an interface circuit, coupled to the antenna, which communicates with another electronic device using a Bluetooth low energy (BTLE) communication protocol. During operation, the interface circuit operates in a single-transmit-power mode associated with a first set of countries or a dual-transmit-power mode associated with a second set of countries. When the electronic device is in the single-transmit-power mode, the interface circuit: transmits advertisements to the other electronic device during an advertising mode using a first transmit power; and communicates data to the other electronic device during a data-transfer mode using the first transmit power. Alternatively, when the electronic device is in a dual-transmit-power mode, the interface circuit: transmits the advertisements to the other electronic device during the advertising mode using the first transmit power; and communicates the data to the other electronic device during the data-transfer mode using a second transmit power.

The first transmit power may be compliant with a first transmit-power regulation associated with distributed-frequency spread spectrum (DFSS) in one of the first set of countries. Alternatively or additionally, the first transmit power may be compliant with a first transmit-power regulation associated with DFSS in one of the second set of countries, and the second transmit power may be compliant with a second transmit-power regulation associated with frequency-hopping spread spectrum (FHSS) in the one of the second set of countries.

Moreover, during operation, the electronic device may: determine a location of the electronic device; identify a country based on the location in one of the first set of countries and the second set of countries; and provide information to the interface circuit specifying one of the single-transmit-power mode and the dual-transmit-power mode based on the identified country.

In some embodiments, the electronic device dynamically determines the location.

Furthermore, when the electronic device is unable to identify the country, the information provided to the interface circuit may specify the single-transmit-power mode.

Additionally, the interface circuit may include: another processor; and additional memory, coupled to the other processor, which stores another program module that is executed by the other processor during operation of the electronic device. This other program module may include instructions for selecting, based on the information, one of the single-transmit-power mode and the dual-transmit-power mode.

The first transmit power may be different than the second transmit power. For example, the first transmit power may be less than or greater than the second transmit power.

Moreover, the advertisements may be transmitted via first channels in the advertising mode and the data may be communicated via second channels in the data-transfer mode, where there may be more of the second channels than the first channels.

Some other embodiments provide a computer-program product for use with the processor, the interface circuit, and/or the electronic device. This computer-program product includes instructions for at least some of the operations performed by the processor, the interface circuit and/or the electronic device described previously.

Some other embodiments provide the interface circuit described previously.

Some other embodiments provide a method for transmitting the advertisements and communicating the data. During operation, the electronic device identifies the country where the electronic device is located. Then, the electronic device selects one of the single-transmit-power mode and the dual-transmit-power mode based on the identified country. Moreover, when the electronic device is in the single-transmit-power mode, the electronic device: transmits the advertisements to the other electronic device during the advertising mode using the first transmit power and the BTLE communication protocol; and communicates the data to the other electronic device during the data-transfer mode using the first transmit power and the BTLE communication protocol. Furthermore, when the electronic device is in the dual-transmit-power mode, the electronic device: transmits the advertisements to the other electronic device during the advertising mode using the first transmit power and the BTLE communication protocol; and communicates the data to the other electronic device during the data-transfer mode using the second transmit power and the BTLE communication protocol The preceding summary is provided as an overview of some exemplary embodiments and to provide a basic understanding of aspects of the subject matter described herein. Accordingly, the above-described features are only examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Like reference numerals refer to corresponding parts throughout the drawings. Moreover, multiple instances of the same part are designated by a common prefix separated from an instance number by a dash.

DETAILED DESCRIPTION

In order to improve communication during an advertising mode, an electronic device (such as a smartphone) may transmit a packet to another electronic device with advertising information using a default transmit power level. Then, based on feedback about a performance metric associated with the communication from the other electronic device, the electronic device may selectively increase the transmit power level for a subsequent packet. Because this selective increase in the transmit power level may increase the overall power consumption, the change in the transmit power level may depend on a battery power level of the electronic device. However, the selective increase in the transmit power level may decrease the overall power consumption by reducing or eliminating retries. After selectively increasing the transmit power level, the electronic device may monitor a set of trigger events, such as a change in the performance metric or a connection being established. If one of the monitored trigger events occurs, the electronic device may selectively modify the transmit power level.

In these ways, the electronic device may improve the communication performance during the advertising mode. This capability may improve the user experience associated with using the electronic device.

In principle, the packets and the feedback may be transmitted and received by radios in the electronic devices in accordance with a wide variety of communication protocols. In the discussion that follows, a communication protocol compatible with Bluetooth™ (from the Bluetooth Special Interest Group of Kirkland, Wash.) is used as an illustration. In particular, Bluetooth Low Energy (BTLE) is used as an illustrative example. However, it should be appreciated that the concepts described herein are not limited a single communication protocol—indeed, the concepts described herein are applicable to any suitable communication protocol used to for communication between electronic devices.

Figure 1:
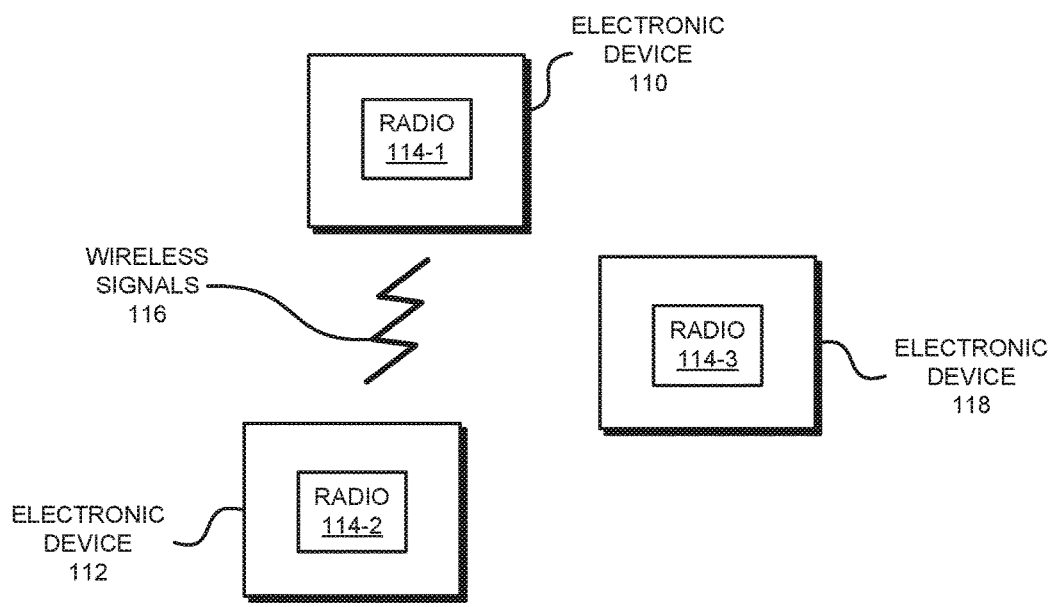
FIG. 1 is a block diagram illustrating example electronic devices communicating wirelessly.

The communication between the electronic devices is illustrated in FIG. 1, which presents a block diagram illustrating electronic devices 110 and 112 wirelessly communicating. In particular, electronic devices 110 and 112 may wirelessly communicate in circumstances such as:

transmitting packets including advertising information in wireless channels during an advertising mode, scanning for packets in the wireless channels during a scanner mode, establishing connections using an initiator mode, and/or transmitting and additionally receiving packets via a connection (which may include additional information as payloads).

Figure 5:
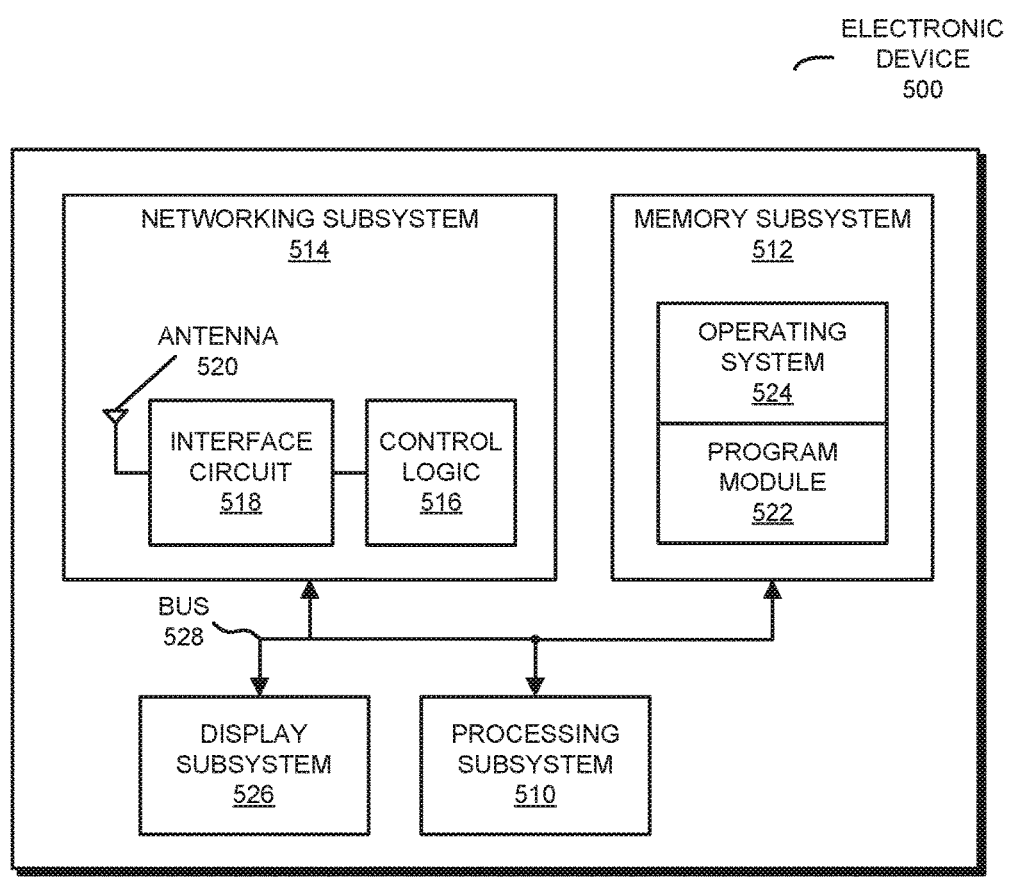
FIG. 5 is a block diagram illustrating an example electronic device, e.g., one of the electronic devices of FIGS. 1 and 6.

As described further below with reference to FIG. 5, electronic devices 110 and 112 may include subsystems, such as a networking subsystem, a memory subsystem, and/or a processor subsystem. In addition, electronic devices 110 and 112 may include radios 114-1 and 114-2 (generically referred to as radios 114, herein) in the networking subsystems. More generally, electronic devices 110 and 112 can include (or can be included within) any electronic devices with networking subsystems that enable electronic devices 110 and 112 to wirelessly communicate with each other and/or another electronic device. This can include transmitting packets with the advertising information on the wireless channels to enable electronic devices to make initial contact with or detect each other, followed by exchanging subsequent data/management frames to establish the connection, configure security options (e.g., IPSec), transmit and receive packets or frames via the connection, etc.

As can be seen in FIG. 1, wireless signals 116 (represented by a jagged line) are transmitted from a radio 114-1 in electronic device 110. These wireless signals 116 are received by radio 114-2 in electronic device 112. In particular, electronic device 110 (such as a smartphone) may broadcast or transmit packets with the advertising information at various transmit times. In turn, electronic device 112 (such as a headset) may receive one or more of the packets, thereby detecting the presence of electronic device 110, by opening scan windows during the various transmit times. This may subsequently allow electronic devices 110 and 112 to optionally establish a connection and communicate with each other.

Power consumption of electronic device 110 may be constrained. For example, electronic device 110 may be implemented as, or otherwise include, a portable electronic device with a battery (such as a rechargeable battery) having finite stored energy. Consequently, electronic device 110 may use BTLE to reduce power consumption during communication with electronic device 112. Typically, packets with advertising information are transmitted using a fixed transmit power level during the advertising mode in BTLE. However, this approach may result in degraded or poor communication with electronic device 112. In turn, the degraded or poor communication may result in retries (which increase the overall power consumption of electronic device 110) and/or a failure of electronic device 112 to detect electronic device 110.

To avoid these problems, electronic device 110 may selectively modify the transmit power level during the advertising mode. In particular, electronic device 110 may transmit a packet to electronic device 112 during the advertising mode using a first (e.g., default) transmit power level. Then, electronic device 110 may receive feedback from electronic device 112 about the communication. For example, the feedback may include information specifying a performance metric associated with the communication, such as any or all of:

a mean-square error of an equalized signal relative to a target pattern, a bit error rate, a packet error rate, a received signal strength indicator, and another link quality metric.

Next, electronic device 110 may selectively modify the transmit power level to a second (higher) transmit power level. This second transmit power level may improve the communication quality when a subsequent packet is transmitted to electronic device 112.

In general, operations in the communication technique may be performed by an interface circuit in the networking subsystem and/or the processing subsystem (which can be implemented as hardware, as software, or some combination of hardware and software, according to various embodiments) in electronic device 110. For example, a program module executed by a processor in the processing subsystem may: compare the performance metric to a threshold value (such as a packet error rate of 30.8%); and may selectively modify a power-state flag based on the comparison (such as when the packet error rate exceeds the threshold value). This modification may change the power-state flag from a value associated with a low-power state to a value associated with a high-power state. Based on the power-state flag, the interface circuit may select the second transmit power level for use when transmitting the subsequent packet during the advertising mode.

Alternatively, fewer or more of the preceding operations may be performed by the interface circuit in electronic device 110. In some embodiments, all of the operations are performed by the interface circuit. For example, after receiving the feedback from electronic device 112, the interface circuit may compare the performance metric to a threshold value, and may selectively transition from the low-power state to the high-power state based on the comparison.

A difference between the second transmit power level and the first transmit power level may be fixed. Alternatively, the difference between the second transmit power level and the first transmit power level may be variable. Thus, during operation the program module further may dynamically select the second transmit power level when the power-state flag is selectively modified.

Because the second (higher) transmit power level in the high-power state may increase the power consumption of electronic device 110, the selective modification of the power-state flag may be based on a battery power level. For example, in some embodiments, modification of the power-state flag to the value associated with the high-power state may be prohibited if the battery power level is too low (such as less than some threshold value, e.g., 5 or 10% remaining charge). However, as noted previously, the use of the second transmit power level may reduce a net power consumption of electronic device 110 by reducing retries during the communication between electronic devices 110 and 112.

As described further below with reference to FIG. 3, after selectively modifying the power-state flag, the program module executed by the processor in electronic device 110 may monitor a set of trigger events and, when a trigger event is detected, may repeat the selective modification of the power-state flag. For example, the set of trigger events may include: a change in the performance metric, and/or establishing a Bluetooth Low Energy connection with an additional electronic device, such as electronic device 118.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as the advertising information or additional information in the payload).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
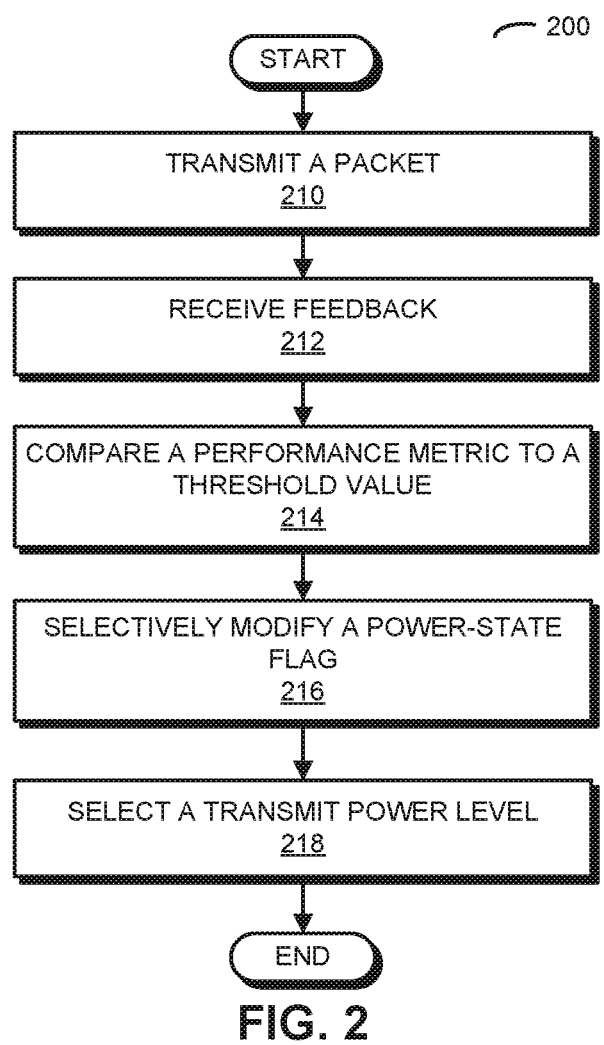
FIG. 2 is a flow diagram illustrating an example method for selectively modifying an operating mode of an electronic device, e.g., one of the electronic devices in FIG. 1.

We now further describe embodiments of the communication technique. FIG. 2 presents a flow diagram illustrating method 200 for selectively modifying an operating mode of an electronic device, such as electronic device 110 in FIG. 1 according to various embodiments. During operation, the electronic device transmits a packet (operation 210) to another electronic device during an advertising mode using a first transmit power level. Then, the electronic device receives feedback (operation 212) from the other electronic device about the communication, where the feedback includes information specifying a performance metric associated with the communication. Moreover, the electronic device compares the performance metric to a threshold value (operation 214). Next, the electronic device selectively modifies a power-state flag (operation 216) based on the comparison, where the modification changes the power-state flag from a value associated with a low-power state to the value associated with a high-power state, and where a second transmit power level in the high-power state is larger than the first transmit power level in the low-power state. Furthermore, the electronic device selects a transmit power level (operation 218) used to transmit a subsequent packet based on the power-state flag.

In this way, the electronic device (for example, a program module, an interface circuit and/or a driver in the electronic device) may facilitate communication between the electronic device and another electronic device with improved communication quality. In particular, advertising packets may be communicated during an advertising mode with an improved performance metric associated with the communication. This may reduce retries and, thus, may improve a user experience when using the electronic device.

Figure 3:
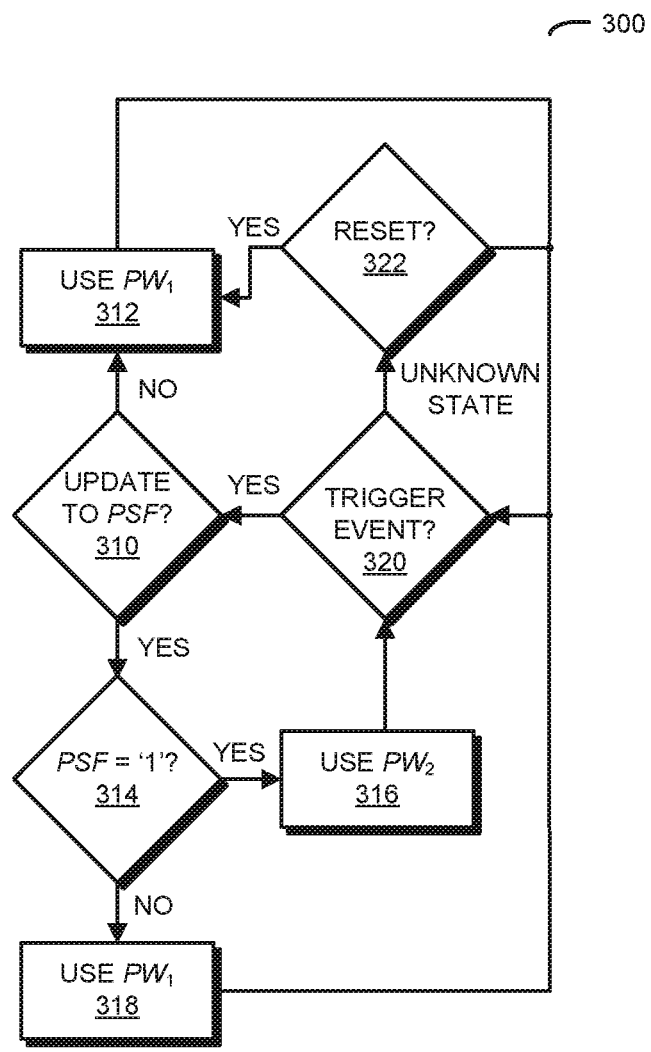
FIG. 3 is a flow diagram illustrating an example method for selectively modifying an operating mode of an electronic device, e.g., one of the electronic devices in FIG. 1.

FIG. 3 presents a flow diagram illustrating method 300 for selectively modifying an operating mode of an electronic device (such as electronic device 110 in FIG. 1), which may be performed by a processor executing a program module and/or an interface circuit. If an update to the power-state flag (PSF) is not available (operation 310), the interface circuit defaults to the low-power state and uses the first (lower) transmit power level or $PW_1$ (operation 312). This default arrangement may ensure that the electronic device has longer battery life, especially if the electronic device spends most of the time in a sleep mode.

However, if an update to the power-state flag is available (operation 310), a determination is made as to whether the power-state flag equals '1' (operation 314) or a value corresponding to the high-power state. Moreover, if the power-state flag equals '1' (operation 314), the interface circuit transitions to the high-power state and uses the second (higher) transmit power level or $PW_2$ (operation 316). Otherwise, the interface circuit defaults to the low-power state and uses the first (lower) transmit power level (operation 318).

Then, the electronic device checks for a trigger event (operation 320), such as a BTLE connection being established with another electronic device, a change in the performance metric and/or another trigger event. If yes (operation 320), the electronic device checks for an update to the power-state flag (operation 310).

After operations 312, 316 and 318, the electronic device may perform operation 320. Furthermore, if hardware in the electronic device is in an unknown state, a reset may be asserted (operation 322) so that the interface circuit defaults to the low-power state and uses the first (lower) transmit power level (operation 312). Otherwise, the electronic device may continue to perform operation 320.

In some embodiments, instead of using a fixed transmit power level for BLTE, the electronic device can adapt the transmit power level. While a fixed transmit power level can offer simplicity (e.g., by avoiding active control) for short distance (such as less than 10 m) communication and/or reduced power consumption, if communication (or link) performance is poor, connections may not be established and/or may be lost. Adapting the transmit power level may address these problems. This may improve a performance metric associated with the communication (and, thus, the link performance or link margin). For example, there may be an improved link margin between a cellular telephone and a headset (and, more generally, for a receiver down link). This approach may represent a reasonable compromise, because even though BTLE is intended to reduce power consumption in portable electronic devices, the transmit power level may be a small component of the total power consumption of the cellular telephone. In addition, the total power consumption may be improved as a result of reducing the number of retries.

Thus, the electronic device may adapt or modify the transmit power level if one or more conditions for a higher transmit power level are met. For example, the one or more conditions may include one or more of:

- a packet error rate for the link that is greater than a predetermined amount (e.g., 30.8% in some embodiments);
- a bit error rate greater than a predetermined amount (e.g., 0.1% in some embodiments);
- a received signal strength indicator of less than a predetermined threshold (e.g., −93 dBm in some embodiments);
- an indication that the link has poor margin or quality (such as the use of error-correction codes, e.g., a cyclic redundancy code, to recover information, or another performance metric exceeding or being less than a threshold value); and/or
- regulatory constraints (such as country-dependent constraints) or requirements regarding the use of the second transmit power level. (Note that link margin may be defined as the difference between the transmit power level and the link sensitivity.) In some embodiments, a difference between the second transmit power level and the first transmit power level may be 7 dBm or 9.5 dBm.

Figure 4:
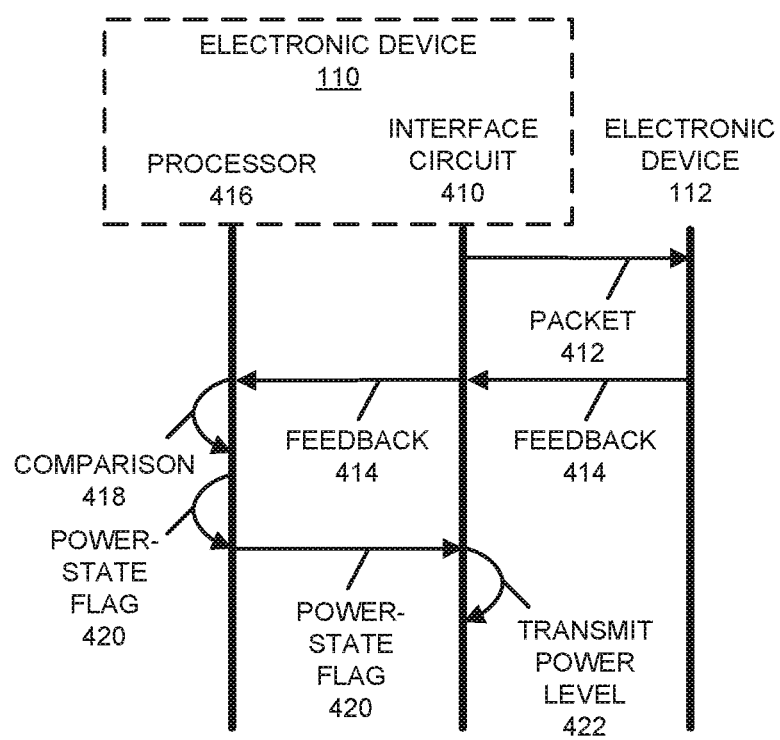
FIG. 4 is a drawing illustrating example communication between electronic devices, e.g., the electronic devices of FIG. 1.

The communication technique is further illustrated in FIG. 4, which presents a drawing illustrating communication between electronic devices, e.g., electronic devices 110 and 112 (FIG. 1). In particular, interface circuit 410 in electronic device 110 may transmit packet 412 to electronic device 112 at a transmit time using a first transmit power level. In turn, electronic device 112 may receive packet 412 by scanning a wireless channel.

Then, electronic device 112 may communicate feedback 414 to interface circuit 410, which provides feedback 414 to processor 416. Processor 416 may execute a program module that: performs a comparison 418 of a performance metric included in feedback 414 and a threshold value; and selectively modifies a power-state flag 420 based on comparison 418, where the modification changes the power-state flag from a value associated with a low-power state to a value associated with a high-power state.

Next, processor 416 provides power-state flag 420 to interface circuit 410. In response, interface circuit 410 selects a transmit power level 422 used to transmit a subsequent packet based on power-state flag 420. For example, a second transmit power level in the high-power state may be larger than the first transmit power level in the low-power state.

In some embodiments of methods 200 (FIG. 2) and 300, there may be additional or fewer operations. Moreover, the order of the operations may be changed, and/or two or more operations may be combined into a single operation or be performed in parallel.

We now describe embodiments of the electronic device. FIG. 5 presents a block diagram illustrating an electronic device 500, such as one of electronic devices 110 and 112 in FIG. 1. Electronic devices 610 and 612 (discussed below) may also be implemented as shown in FIG. 5, according to various embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include any or all of dynamic random access memory (DRAM), static random access memory (SRAM), and/or other types of memory. In some embodiments, instructions for processing subsystem 510 in memory subsystem 512 include: one or more program modules or sets of instructions (such as program module 522 and/or operating system 524), which may be executed by processing subsystem 510. The one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and/or communicate on a wired and/or wireless network (i.e., to perform network operations), for example control logic 516, an interface circuit 518 and an antenna 520. For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Mechanisms used for coupling to, communicating on, and handling data and events on the network for each network system are sometimes collectively referred to as a 'network interface' for the network system. Moreover, in some embodiments a 'network' between the electronic devices does not yet exist.

Therefore, electronic device 500 may use the mechanisms in networking subsystem 514 for performing simple wireless communication between the electronic devices, e.g., transmitting advertising packets or frames and/or scanning for advertising packets or frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Additionally, one or more of the subsystems may not be present in electronic device 500. Moreover, in some embodiments, electronic device 500 may include one or more additional subsystems that are not shown in FIG. 5. For example, electronic device 500 can include, but is not limited to, a data collection subsystem, an audio and/or video subsystem, an alarm subsystem, a media processing subsystem, and/or an input/output (I/O) subsystem. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. The radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. ('monitoring' as used herein comprises receiving signals from other electronic devices and possibly performing one or more processing operations on the received signals, e.g., determining if the received signal comprises an advertising packet or frame, etc.)

While a communication protocol compatible with the Bluetooth™ Low Energy standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

Figure 6:
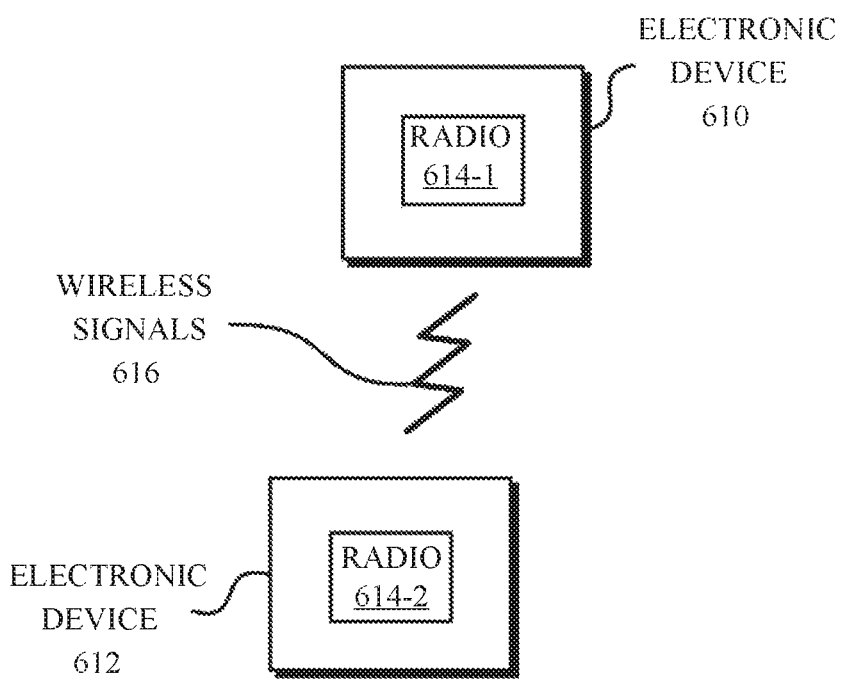
FIG. 6 is a block diagram illustrating example electronic devices wirelessly communicating.

FIG. 6 presents a block diagram illustrating electronic devices 610 and 612 that are capable of wirelessly communicating in single or dual transmit power modes according to various embodiments of the disclosure. In particular, these electronic devices may wirelessly communicate while: transmitting packets (which are sometimes referred to as 'advertisements') with advertising information in wireless channels during an advertising mode, scanning for packets in the wireless channels during a scanner mode, establishing connections using an initiator mode, and/or transmitting and additionally receiving additional packets via a connection (which may include additional information or data as payloads).

As described above with reference to FIG. 5, electronic devices 610 and 612 may include subsystems, such as a networking subsystem, a memory subsystem and a processor subsystem. In addition, electronic devices 610 and 612 may include radios 614-1 and 614-2 (generically referred to as radios 614, herein) in the networking subsystems. More generally, electronic devices 610 and 612 can include (or can be included within) any electronic devices with the networking subsystems that enable electronic devices 610 and 612 to wirelessly communicate with another electronic device. This can include transmitting/receiving advertisements on the wireless channels to enable electronic devices to make initial contact with or detect each other, followed by exchanging subsequent data/management frames to establish the connection, configure security options (e.g., IPSec), transmit and receive packets or frames with the data via the connection, etc.

As can be seen in FIG. 6, wireless signals 616 (represented by a jagged line) are transmitted from a radio 614-1 in electronic device 610. These wireless signals 616 are received by radio 614-2 in electronic device 612. In particular, electronic device 610 (such as a smartphone) may broadcast or transmit advertisements at transmit times. In turn, electronic device 612 (such as a headset) may receive one or more of the advertisements, thereby detecting the presence of electronic device 610, by opening scan windows during the transmit times. This may subsequently allow electronic devices 610 and 612 to optionally establish a connection and communicate the data with each other via the additional packets.

However, the transmit power used by electronic device 610 may be constrained. In particular, in some countries or regulatory regions, BTLE is characterized as a distributed-frequency spread-spectrum (DFSS) communication protocol instead of a frequency-hopping spread-spectrum (FHSS) communication protocol because it often does not meet the minimum number of hopping channels and dwell time requirements of FHSS. Consequently, because of regulatory constraints, the transmit power used to communicate the advertisements and the additional packets with the data may be restricted. As noted previously, this can degrade the performance of the communication with the other electronic devices (such as a performance metric associated with the communication, e.g., a mean-square error of an equalized signal relative to a target pattern, a bit error rate, a packet error rate, a received signal strength indicator, and/or another link quality metric). In turn, the degraded performance can adversely impact the user experience (e.g., the degraded or poor communication may result in retries)

To avoid these problems, when allowed by the communication regulations in a given country or regulatory region (such as a group of countries or a region within a country), electronic device 610 may use different transmit powers to communicate the advertisements and the additional packets with the data. In particular, electronic device 610 may determine its location (e.g., via triangulation and/or trilateration, such as via or using: the Global Positioning System, a wireless local area network, a cellular-telephone network, a local positioning system, a location service, etc.). Then, electronic device 610 may identify a country or a regulatory region based on the determined location, and may select, based on the identified country, a single-transmit-power mode associated with a first set of countries or a dual-transmit-power mode associated with a second set of countries. When electronic device 610 is in the single-transmit-power mode, an interface circuit in the networking subsystem may: transmit advertisements to electronic device 612 during an advertising mode using a first transmit power (or a first transmit power level); and communicate the data to electronic device 612 during a data-transfer mode using the first transmit power. Alternatively, when electronic device 610 is in the dual-transmit-power mode, the interface circuit may: transmit the advertisements to electronic device 612 during the advertising mode using the first transmit power; and, communicate the data to electronic device 612 during the data-transfer mode using a second transmit power (or a second transmit power level). In some embodiments, when electronic device 610 is unable to identify the country, the electronic device may select or use the single-transmit-power mode as the default.

In general, operations in the communication technique may be performed by the interface circuit in the networking subsystem and/or the processing subsystem (i.e., in hardware and/or in software) in electronic device 610. For example, a program module executed by a host processor in the processing subsystem may: determine the location; identify the country; and provide information to the interface circuit specifying the single-transmit-power mode or the dual-transmit-power mode based on the identified country. In particular, the program module may set a flag for the interface circuit that specifies the single-transmit-power mode or the dual-transmit-power mode. Similarly, the operations of the interface circuit may be performed by another program module (such as an embedded operating system or firmware) that is executed by an embedded processor in the interface circuit. However, more or less of the communication technique may be performed by the host processor or the embedded processor. Alternatively, some or all of the communication technique may be performed by hardware (instead of software). Therefore, in some embodiments, all of the operations in the communication technique are performed by the interface circuit.

The first transmit power may be different than the second transmit power. In particular, the first transmit power may be less than or greater than the second transmit power. Furthermore, a difference between the first transmit power and the second transmit power may be fixed, such as when the first transmit power and the second transmit power are, respectively, the maximum allowed values per the regulatory constraints in the associated country or regulator region. Alternatively, the difference between the first transmit power and the second transmit power may be variable. Thus, during operation, the program module and/or the other program module may dynamically select the first transmit power and/or the second transmit power. This dynamic adaptation of the first transmit power and/or the second transmit power may be based on a variety of factors, including battery power level. For example, if the battery power level is too low (such as less than another threshold value, e.g., 5 or 10% remaining charge), the first transmit power and/or the second transmit power may be constrained.

In the described embodiments, processing a packet or frame in either of electronic devices 610 and 612 includes: receiving wireless signals 616 with the packet or frame; decoding/extracting the packet or frame from received wireless signals 616 to acquire the packet or frame; and processing the packet or frame to determine information contained in the packet or frame (such as the advertising information or the data in the payload).

Although we describe the network environment shown in FIG. 6 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 7:
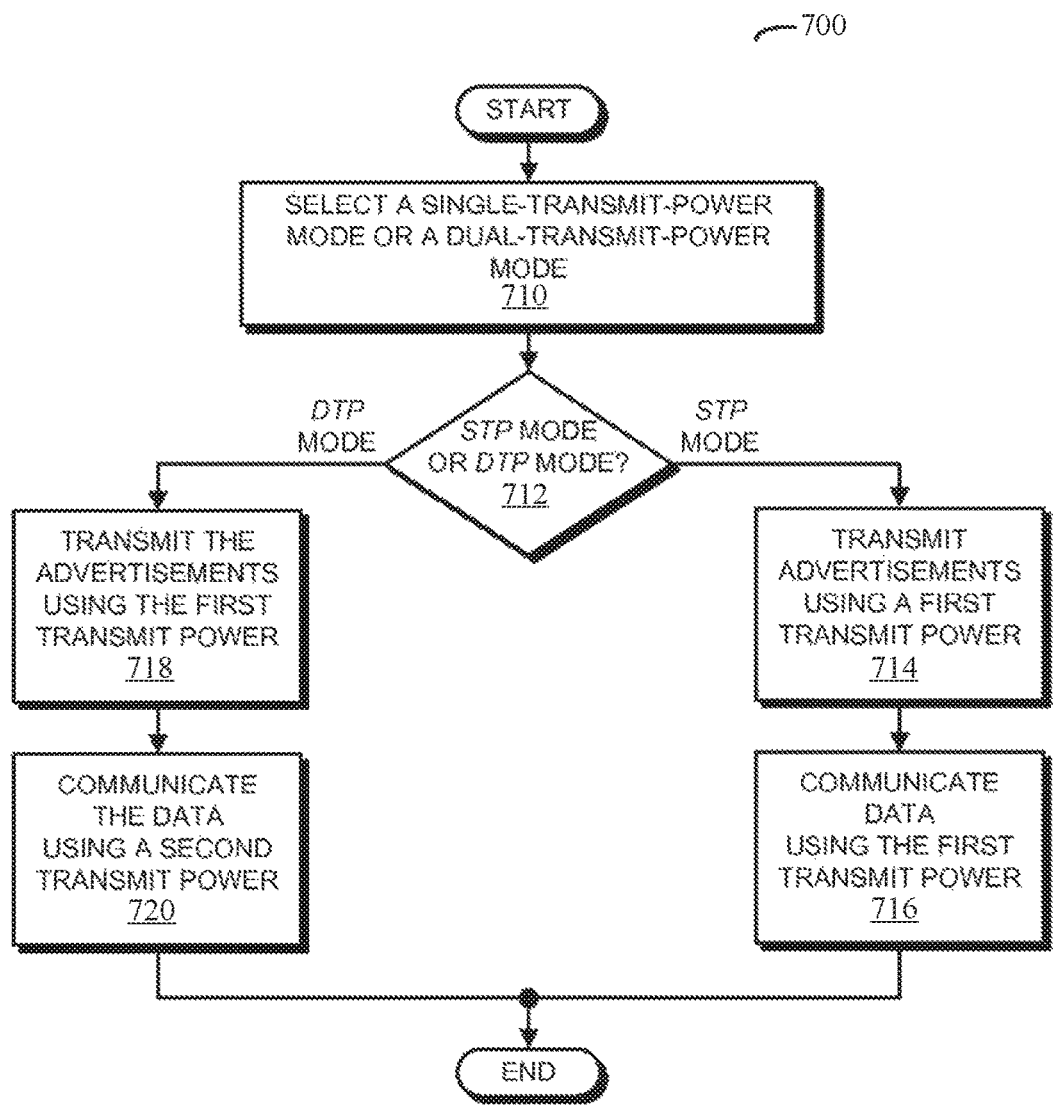
FIG. 7 is a flow diagram illustrating an example method for transmitting advertisements and communicating data using an electronic device, e.g., one of the electronic devices in FIG. 1.

We now further describe embodiments of the communication technique. FIG. 7 presents a flow diagram illustrating method 700 for transmitting the advertisements and communicating the data using an electronic device, such as electronic device 610 in FIG. 6. During operation, the electronic device selects a single-transmit-power (STP) mode or a dual-transmit-power (DTP) mode (operation 710). For example, the selection (operation 710) may be based on country (or regulatory-region) information that is received by the electronic device from an external source (such as a cellular-telephone system) or that is stored in the electronic device. Alternatively or additionally, the electronic device may determine the location of the electronic device and may identify the country (or regulatory region) where the electronic device is located based on the determined location. Then, the selection (operation 710) may be based on the identified country. The location of the electronic device may be determined dynamically, such as every minute, 5 min., 10 min., etc. Moreover, when the electronic device is unable to identify the country or the regulatory region, the transmit-power state may default to the single-transmit-power mode.

When the single-transmit-power mode is selected (operation 712), the electronic device: transmits advertisements, to another electronic device during an advertising mode, using a first transmit power (operation 714) and a BTLE communication protocol; and communicates data, to the other electronic device during a data-transfer mode, using the first transmit power (operation 716) and the BTLE communication protocol. While FIG. 7 depicts the method 700 as ending at this point, it is also possible for the method to loop back to operation 710 to facilitate reevaluation of the mode based on, for instance, changing location.

Alternatively, when the dual-transmit-power mode is selected (operation 712), the electronic device: transmits the advertisements, to the other electronic device during the advertising mode, using the first transmit power (operation 718) and the BTLE communication protocol; and communicates the data, to the other electronic device during the data-transfer mode, using a second transmit power (operation 720) and the BTLE communication protocol. According to some embodiments, one or more subsequent advertisements may also be transmitted at the second transmit power when the electronic device is operating in dual power mode.

In this way, the electronic device (for example, a program module executed by a host processor and/or firmware executed by an interface circuit in the electronic device) may facilitate communication between the electronic device and the other electronic device with improved communication quality. In particular, packets or frames with the data communicated during the data-transfer mode may be communicated with an improved performance metric associated with the communication by using the dual-transmit-power mode. This may reduce retries and, thus, may improve aspects such as a user experience, device performance, coexistence, etc. when using the electronic device.

Figure 8:
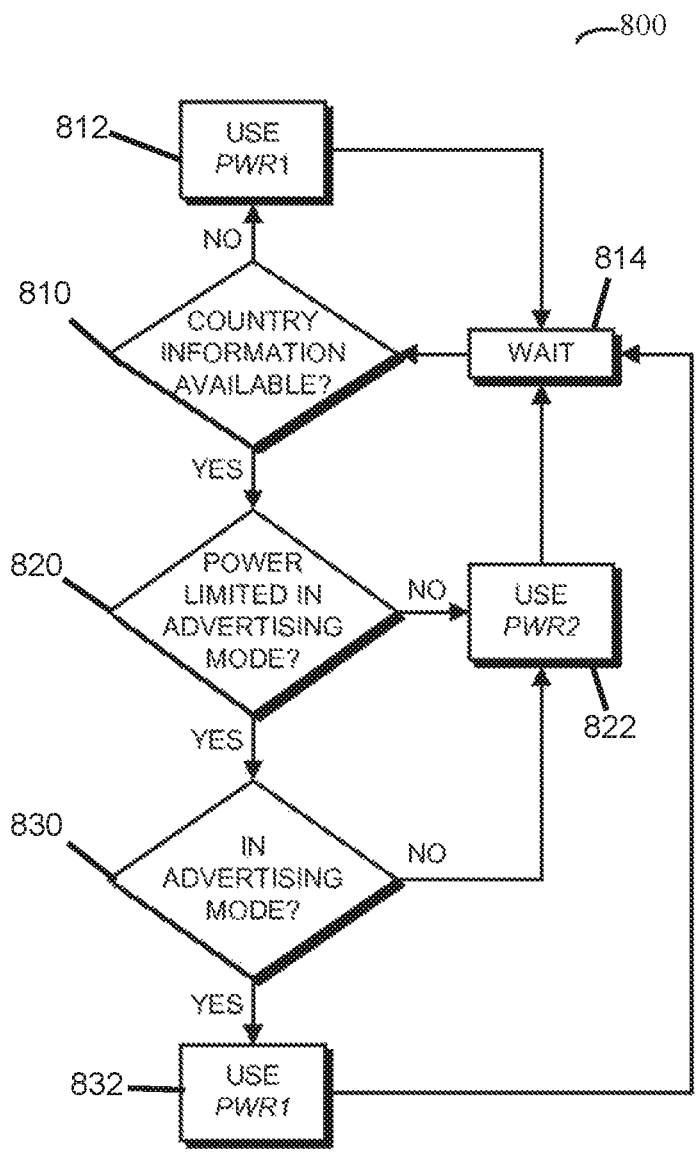
FIG. 8 is a flow diagram illustrating an example method for transmitting advertisements and communicating data using an electronic device, e.g., one of the electronic devices in FIG. 1.

FIG. 8 presents a flow diagram illustrating method 800 for transmitting advertisements and communicating data using an electronic device (such as electronic device 610 in FIG. 6), which may be performed by the host processor executing the program module and/or the interface circuit (e.g., an embedded processor executing another program module or firmware). During operation, it is determined (at operation 810) if country (or regulatory-region) information is unavailable. If the country (or regulatory-region) information is unavailable, the electronic device defaults to the single-transmit-power mode with the first transmit power (PWR1) (operation 812). Then, the electronic device waits a time interval (such as 1 s, 10 s, 1 min, 5 min, etc.) or until an event occurs (such as a trigger or an interrupt indicating the availability of the country information) (operation 814). After the time interval or the occurrence of the event, the electronic device repeats the assessment as to whether the country information is available (operation 810).

If the country information is available, the electronic device determines whether the country belongs to a region where the BTLE power is limited when the electronic device is in an advertising mode (operation 820). If not, the electronic device uses the single-transmit-power mode with the second transmit power (PWR2) (operation 822), and then waits the time interval or until the event occurs (operation 814).

However, if the country belongs to a region where the BTLE power is limited when the electronic device is in the advertising mode, the electronic device uses the dual-transmit-power mode and determines whether the electronic device is in the advertising mode (operation 830). If not, the electronic device uses the second transmit power (PWR2) (operation 822) and then waits the time interval or until the event occurs (operation 814). Alternatively, if the electronic device is in the advertising mode, the electronic device uses the first transmit power (operation 832) and then waits the time interval or until the event occurs (operation 814).

In an exemplary embodiment, in some countries or regulatory regions, BTLE is characterized as a DFSS communication protocol instead of an FHSS communication protocol because it does not meet minimum hopping channel and dwell time requirements for FHSS during the advertising mode at the beginning of connection. In these cases, the communication using BTLE (in the advertising mode and the data-transfer mode) is penalized by strong limits on the maximum transmit power. Consequently, the electronic device cannot take advantage of the higher transmit power that is often allowed under FHSS regulation for BTLE.

The communication technique addresses this problem by allowing different modes when communicating using BTLE. In particular, in a single-transmit-power mode, the same transmit power is used during an advertising mode and a data-transfer mode. When the electronic device is in the single-transmit-power mode and is transmitting advertisements (and is only hopping on three channels and, thus, is non-compliant with FHSS requirements), the transmit power may be restricted per DFSS requirements. This transmit power may also be used to communicate the data during the data-transfer mode. However, when the electronic device is in the dual-transmit-power mode and is transmitting advertisements (and is still only hopping on three channels and, thus, is non-compliant with FHSS requirements), the transmit power may be restricted per DFSS requirements. But when the electronic device is communicating the data during the data-transfer mode (and is hopping on 37 channels and, thus, is in compliance with FHSS requirements), a different (and, in general, larger) transmit power may be used.

For example, BTLE may use 40 channels that are 2 MHz apart between 2.402 GHz to 2.480 GHz, including three advertising channels (which are sometimes referred to as 'first channels') that are used for conveying advertisements during the advertising mode and 37 data channels (which are sometimes referred to as 'second channels') that convey packets with the data during the data-transfer mode. The data rate may be 1 Mbit/s using Gaussian-frequency-shift-keying modulation. Moreover, the size of an advertising packet may be as long as 33 bytes with a transmission time of approximately 0.25 ms, and the size of a data packet may vary from 2 to 39 bytes with transmission times from 80 μs to 0.3 ms.

A wide range of transmit powers may be used depending on the interface circuit, the antenna, and the country or regulatory region. For example, the first transmit power may be 9-10 dBm, and the second transmit power may be 19-20 dBm. However, these values are for purposes of illustration only. More generally, the transmit power may be between 5-30 dBm.

Figure 9:
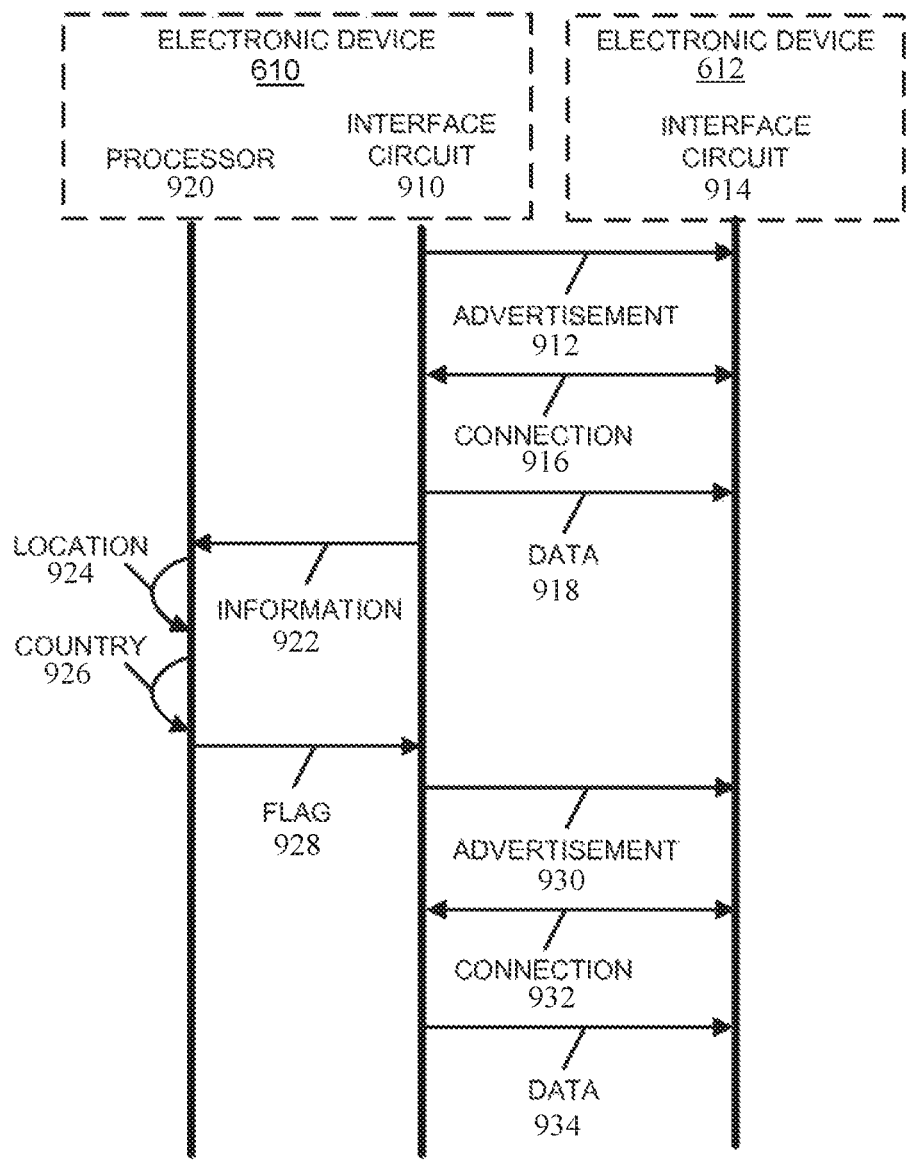
FIG. 9 is a drawing illustrating example communication between electronic devices, e.g., the electronic devices of FIG. 6.

The communication technique is further illustrated in FIG. 9, which presents a drawing illustrating communication between electronic devices 610 and 612 (FIG. 6). In particular, when in the single-transmit-power mode, interface circuit 410 in electronic device 610 may transmit advertisement 912 to electronic device 612 at a transmit time using the first transmit power level. In turn, interface circuit 914 in electronic device 612 may receive packet 912 by scanning one or more wireless channels. Then, after interface circuits 910 and 914 establish a connection 916, interface circuit 910 may communicate data 918 to interface circuit 914 using the first power level.

Subsequently, processor 920 may determine location 924 of electronic device 610, e.g., based on information 922 received from interface circuit 910. Using location 924, processor 920 may identify country 926 and may set a flag 928 that specifies the dual-transmit-power mode.

If connection 916 is no longer established, interface circuit 910 in electronic device 610 may transmit advertisement 930 to electronic device 612 at a transmit time using the first transmit power level. In turn, interface circuit 914 in electronic device 612 may receive packet 930 by scanning the one or more wireless channels. Then, after interface circuits 910 and 914 establish a connection 932, interface circuit 910 may communicate data 934 to interface circuit 914 using the second power level.

In some embodiments of methods 700 (FIG. 7) and 800 (FIG. 8), there may be additional or fewer operations. Moreover, the order of the operations may be changed, and/or two or more operations may be combined into a single operation or may be performed in parallel.

While the preceding embodiments illustrated the communication technique using the advertising mode as an example, in other embodiments the communication technique is used during communication in other operating modes.

In the preceding description, we refer to 'some embodiments'; 'some embodiments' describe a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a memory;
   one or more processors coupled to the memory;
   an antenna; and
   an interface circuit coupled to the antenna and the one or more processors, wherein the interface circuit is configured to communicate with an other electronic device using a communication protocol, wherein the interface circuit is configured to operate in either a single-transmit-power mode with respect to a first country or a dual-transmit-power mode with respect to a second country;
   wherein the one or more processors are further configured to:
      determine that the electronic device is in the dual-transmit-power mode;
      transmit, via the interface circuit, a packet during an advertising mode to the other electronic device using a first transmit power and the communication protocol, wherein the first transmit power is compliant with a first transmit-power regulation associated with distributed-frequency spread spectrum (DFSS) in the second country;
      receive, via the interface circuit, feedback from the other electronic device comprising a performance metric associated with the packet transmitted;
      compare the performance metric to a threshold value;
      based on the comparison, selectively modify the first transmit power;
      transmit, via the interface circuit, a second packet during the advertising mode to the other electronic device using the modified first transmit power, wherein the modified first transmit power is higher than the first transmit power; and
      communicate data via the interface circuit, to the other electronic device using a second transmit power and the communication protocol, wherein the second transmit power is compliant with a second transmit-power regulation associated with frequency-hopping spread spectrum (FHSS) in the second country.

2. The electronic device of claim 1, wherein the one or more processors are further configured to:
   determine subsequently, that the electronic device is in the single-transmit-power mode;
   transmit one or more advertisements via the interface circuit, to the other electronic device using the first transmit power;
   communicate data via the interface circuit, to the other electronic device using the first transmit power, wherein the first transmit power is compliant with a first transmit-power regulation associated with (DFSS) in the first country.

3. The electronic device of claim 1, wherein to determine, the one or more processors are further configured to:
   determine a location of the electronic device;
   identify the second country that corresponds with the location; and
   specify the dual-transmit-power mode based at least in part on the identifying.

4. The electronic device of claim 3, wherein the one or more processors are further configured to periodically determine whether the location has changed.

5. The electronic device of claim 1, wherein the one or more processors are further configured to:
   determine that a location of the electronic device cannot be identified; and
   specify the single-transmit-power mode in response to not being able to identify the location.

6. The electronic device of claim 1, wherein the first transmit power is different than the second transmit power.

7. The electronic device of claim 6, wherein the first transmit power is less than the second transmit power.

8. The electronic device of claim 1, wherein the one or more processors are further configured to periodically evaluate whether to operate in the single-transmit-power mode or in the dual-transmit-power mode.

9. A non-transitory computer-readable medium storing instructions that, when executed by a processor of a electronic device, cause the processor to perform operations, the operations comprising:
 determining, based at least in part on a location of the electronic device, that the electronic device is in a dual-transmit-power mode with respect to a country;
 transmitting a packet during an advertising mode to an other electronic device using a first transmit power and a communication protocol, wherein the first transmit power is compliant with a first transmit-power regulation associated with distributed-frequency spread spectrum (DFSS) in the country;
 receiving feedback from the other electronic device comprising a performance metric associated with the packet transmitted;
 comparing the performance metric to a threshold value;
 based on the comparison, selectively modifying the first transmit power;
 transmitting a second packet during the advertising mode to the other electronic device using the modified first transmit power; and
 communicating data to the other electronic device using a second transmit power and the communication protocol, wherein the second transmit power is compliant with a second transmit-power regulation associated with frequency-hopping spread spectrum (FHSS) in the country.

10. A method comprising:
 identifying a country where an electronic device is located;
 determining that an advertising mode power is limited based at least in part on the country;
 transmitting a packet during an advertising mode to an other electronic device using a first transmit power and a communication protocol, wherein the first transmit power is compliant with a first regulation associated with distributed-frequency spread spectrum (DFSS) in the country;
 receiving feedback from the other electronic device comprising a performance metric associated with the packet transmitted;
 comparing the performance metric to a threshold value;
 based on the comparison, selectively modifying the first transmit power;
 transmitting a second packet during the advertising mode to the other electronic device using the modified first transmit power, wherein the modified first transmit power is different than the first transmit power; and
 communicating data to the other electronic device using a second transmit power and the communication protocol, wherein the second transmit power is compliant with a second transmit-power regulation associated with frequency-hopping spread spectrum (FHSS) in the country.

11. The method of claim 10, wherein the communication protocol comprises a Bluetooth Low Energy (BTLE) protocol.

12. The method of claim 10, further comprising:
 determining that the electronic device is in a single-transmit-power mode;
 transmitting advertisements to the other electronic device using the first transmit power; and
 communicating data to the other electronic device using the first transmit power, wherein the first transmit power is compliant with a first transmit-power regulation associated with DFSS in an other country.

13. The method of claim 10, wherein the identifying the country comprises:
 determining a location of the electronic device; and
 identifying the country corresponding to the location determined.

14. The method of claim 10, further comprising:
 subsequent to the communicating data, determining that an event occurs; and
 in response to the determining that the event occurred, assessing whether country information is available.

15. The electronic device of claim 1, wherein the one or more processors are configured to selectively modify based at least on a battery power level of the electronic device.

16. The electronic device of claim 1, wherein to selectively modify the first transmit power, the one or more processors are configured to change a power-state flag value associated with a low-power state and the first transmit power, to a high-power state associated with the modified first transmit power.

17. The electronic device of claim 16, wherein a difference between the modified first transmit power and the first transmit power is dynamically selected.

18. The electronic device of claim 16, wherein a difference between the modified first transmit power and the first transmit power is a fixed value.

19. The electronic device of claim 16, wherein the one or more processors are further configured to:
 monitor a set of trigger events associated with the other electronic device;
 detect a trigger event of the set of trigger events; and
 repeat the selectively modify.

20. The electronic device of claim 19, wherein the set of trigger events comprises: a change in the performance metric; or a Bluetooth Low Energy connection established with the other electronic device.

* * * * *